(12) United States Patent
Zhang et al.

(10) Patent No.: US 10,849,077 B2
(45) Date of Patent: Nov. 24, 2020

(54) INTERFERENCE MANAGEMENT FOR NEW RADIO-SPECTRUM SHARING (NR-SS)

(71) Applicant: QUALCOMM Incorporated, San Diego, CA (US)

(72) Inventors: Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 15/878,771

(22) Filed: Jan. 24, 2018

(65) Prior Publication Data

US 2018/0220379 A1 Aug. 2, 2018

Related U.S. Application Data

(60) Provisional application No. 62/451,214, filed on Jan. 27, 2017.

(51) Int. Cl.
*H04W 4/00* (2018.01)
*H04W 52/24* (2009.01)
*H04W 72/08* (2009.01)
*H04W 16/14* (2009.01)
*H04W 52/36* (2009.01)
*H04W 74/08* (2009.01)
*H04W 72/04* (2009.01)
(Continued)

(52) U.S. Cl.
CPC ......... *H04W 52/243* (2013.01); *H04W 16/14* (2013.01); *H04W 52/244* (2013.01); *H04W 52/346* (2013.01); *H04W 52/36* (2013.01); *H04W 52/38* (2013.01); *H04W 72/0473* (2013.01); *H04W 72/082* (2013.01); *H04W 74/0808* (2013.01); *H04W 52/383* (2013.01)

(58) Field of Classification Search
CPC .................................................. H04W 52/244
See application file for complete search history.

(56) References Cited

U.S. PATENT DOCUMENTS 9,326,157 B1 * 4/2016 Bhorkar ................ H04W 16/14
9,854,607 B1 * 12/2017 Chu ..................... H04W 52/241
(Continued)

FOREIGN PATENT DOCUMENTS

WO  WO-2011053974 A1   5/2011

OTHER PUBLICATIONS

International Search Report and Written Opinion—PCT/US2018/015156—ISA/EPO—dated May 8, 2018.

*Primary Examiner* — Guang W Li
(74) *Attorney, Agent, or Firm* — Haynes and Boone, LLP

(57) ABSTRACT

Wireless communications systems and methods related to interference management among communications of network operating entities of different power classes over a spectrum are provided. A first wireless communication device identifies a transmission opportunity (TXOP) in a spectrum shared by a plurality of network operating entities. The first wireless communication device is associated with a first network operating entity of the plurality of network operating entities. The first wireless communication device determines a first transmission power level. The first wireless communication device communicates, with a second wireless communication device associated with the first network operating entity based on the first transmission power level, data during the TXOP.

28 Claims, 12 Drawing Sheets

(51) Int. Cl.
*H04W 52/38* (2009.01)
*H04W 52/34* (2009.01)

(56) References Cited

U.S. PATENT DOCUMENTS

| | | | | |
|---|---|---|---|---|
| 2010/0284380 A1* | 11/2010 | Banerjee | H04W 16/14 | 370/338 |
| 2012/0224484 A1* | 9/2012 | Babiarz | H04L 41/5019 | 370/235 |
| 2012/0243519 A1* | 9/2012 | Koskela | H04W 74/0816 | 370/338 |
| 2013/0203429 A1* | 8/2013 | Kneckt | H04W 72/1263 | 455/450 |
| 2013/0235823 A1* | 9/2013 | Kneckt | H04W 72/02 | 370/329 |
| 2013/0295948 A1 | 11/2013 | Ye et al. | | |
| 2014/0328270 A1* | 11/2014 | Zhu | H04W 74/002 | 370/329 |
| 2016/0081114 A1* | 3/2016 | Jung | H04W 72/04 | 370/329 |
| 2016/0105897 A1* | 4/2016 | Liu | H04W 72/1226 | 370/235 |
| 2016/0119239 A1* | 4/2016 | Weitzman | H04W 16/04 | 370/230.1 |
| 2016/0234706 A1* | 8/2016 | Liu | H04L 5/0048 | |
| 2016/0302076 A1* | 10/2016 | Chou | H04W 16/14 | |
| 2017/0117997 A1* | 4/2017 | Park | H04L 5/0057 | |
| 2017/0230986 A1* | 8/2017 | Moon | H04W 74/0808 | |
| 2017/0231001 A1* | 8/2017 | Yang | H04W 74/08 | |
| 2018/0007714 A1* | 1/2018 | Yoshimura | H04W 74/0816 | |
| 2018/0020447 A1* | 1/2018 | Thubert | H04W 72/0446 | |
| 2018/0139781 A1* | 5/2018 | Park | H04W 74/0808 | |
| 2018/0242264 A1* | 8/2018 | Pelletier | H04W 52/146 | |
| 2018/0288805 A1* | 10/2018 | Bhorkar | H04L 5/0048 | |
| 2019/0014594 A1* | 1/2019 | Park | H04W 72/04 | |
| 2020/0045556 A1* | 2/2020 | Xue | H04W 72/1247 | |

* cited by examiner

INTERFERENCE MANAGEMENT FOR NEW RADIO-SPECTRUM SHARING (NR-SS)

CROSS REFERENCE TO RELATED APPLICATIONS

The present application claims priority to and the benefit of the U.S. Provisional Patent Application No. 62/451,214, filed Jan. 27, 2017, which is hereby incorporated by reference in its entirety as if fully set forth below and for all applicable purposes.

TECHNICAL FIELD

This application relates to wireless communication systems, and more particularly to managing interference among communications of network operating entities of different power classes over a frequency spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing. In a priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

Interference can occur when network operators of different power classes shared the same spectrum. For example, a high power class node may transmit at a substantially higher transmission power level than a low power class node. When a low power class node transmits a reservation signal to reserve the channel for transmission, the reservation signal may not be detected by a high power class node due to the disparity between the transmission power levels of the high power class node and the low power class node. The missed detection can cause the high power class node to proceed to reserve the channel and transmit in the same time period as the low power class node. Since the high power class node transmits at a higher transmission power level than the low power class node, the transmission of the high power class node can cause noticeable interference to the transmission of the low power class node. Accordingly, improved procedures for managing interference among communications of network operators of different power classes are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes identifying, by a first wireless communication device associated with a first network operating entity of a plurality of network operating entities, a transmission opportunity (TXOP) in a spectrum shared by the plurality of network operating entities; determining, by the first wireless communication device, a first transmission power level; and communicating, by the first wireless communication device with a second wireless communication device associated with the first network operating entity based on the first transmission power level, data during the TXOP.

In an additional aspect of the disclosure, an apparatus includes a processor configured to identify, a transmission opportunity (TXOP) in a spectrum shared by a plurality of network operating entities, wherein the apparatus is associated with a first network operating entity of the plurality of network operating entities; and determine a first transmission power level; and a transceiver configured to communicate, with a second wireless communication device associated with the first network operating entity based on the first transmission power level, data during the TXOP.

In an additional aspect of the disclosure, a computer-readable medium having program code recorded thereon, the program code includes code for causing a first wireless communication device to identify a transmission opportunity (TXOP) in a spectrum shared by a plurality of network operating entities, wherein the first wireless communication device is associated with a first network operating entity of the plurality of network operating entities; code for causing the first wireless communication device to determine a first transmission power level; and code for causing the first wireless communication device to communicate, with a second wireless communication device associated with the first network operating entity based on the first transmission power level, data during the TXOP.

In an additional aspect of the disclosure, an apparatus includes means for identifying a transmission opportunity (TXOP) in a spectrum shared by a plurality of network operating entities, wherein the apparatus is associated with a first network operating entity of the plurality of network operating entities; means for determining a first transmission power level; and means for communicating, with a second wireless communication device associated with the first network operating entity based on the first transmission power level, data during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
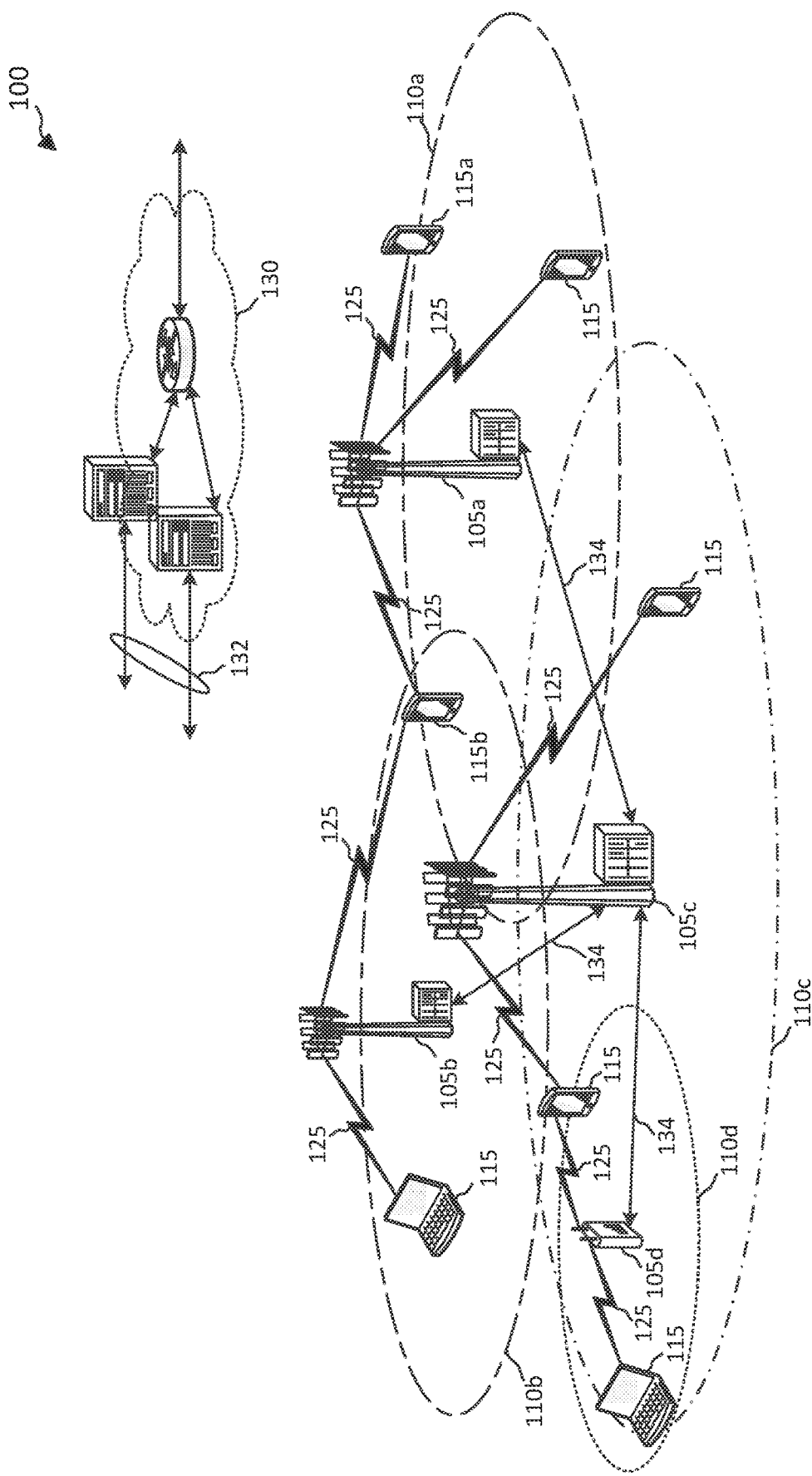
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

One approach to managing interference among operators of different power classes in a priority-based coordinated spectrum sharing scheme is to increase the transmission power of reservation signals at low-power nodes (e.g., pico nodes). For example, a low-power node may increase a total transmission energy by increasing the transmission power, reducing a transmission bandwidth, and/or reducing a number of active tones. Another approach is to increase the time span of reservation signals from low-power nodes, and thus increasing the total transmission energy. Such approaches may be effective when there is no significant power difference between low-power pico nodes and high-power macro nodes. However, in some embodiments, the power difference between low-power pico nodes and high-power macro nodes can be large. For example, it may be difficult to account for a 20 decibels (dB) power difference by increasing the transmission power and/or duration of the reservation signals at the low-power pico nodes as it may significantly increase the system overhead of the low-power pico nodes.

The present disclosure describes interference management mechanisms in a spectrum shared by multiple network operating entities of different power classes. In a priority-based spectrum sharing scheme, a spectrum is time-partitioned into transmission opportunities (TXOPs). Each TXOP is designated for prioritized use by a prioritized or high priority network operating entity and opportunistic use by low priority network operating entities based on reservations. The disclosed embodiments minimize interference from high-power macro nodes to low-power pico nodes by adjusting reservation signal detection thresholds and/or transmission power levels. For example, a low priority node can determine a threshold for detecting reservation signals from high priority nodes based on operating transmission power levels of the high priority nodes. The operating transmission power level refers to the nominal transmission power level during normal operation. Alternatively, a low priority node can determine a threshold for detecting reservation signals from high priority nodes based on an operating transmission power level of the low priority node. In addition, during opportunistic transmission, a low priority node can adjust the transmission power level to a level comparable to an operating transmission power level of a high priority node. To facilitate the adjustments based on high priority nodes' operating transmission power levels, a central authority (e.g., a spectrum access system (SAS)) can provide transmission power level information of network operating entities to the operator nodes in addition to priority information of the network operating entities.

Aspects of the present disclosure can provide several benefits. For example, the adjustments of the reservation signal detection thresholds at the high-power nodes can improve the detectability of low-power nodes' reservation signals. The adjustments of transmission power levels of opportunistic transmissions at the high-power nodes can reduce interference from high-power nodes to low-power nodes. Thus, the disclosed embodiments can reduce interference and improve resource utilization efficiency. The disclosed embodiments are suitable for use in coverage areas including macro cells (e.g., with high-power nodes) and small cells or pico cells (e.g., with low-power nodes). The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes an UL subframe in an UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. AN UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-automatic request Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include an SAS. In addition, the transmissions from the multiple network operating entities can be time synchronized to facilitate the coordination.

Figure 2:
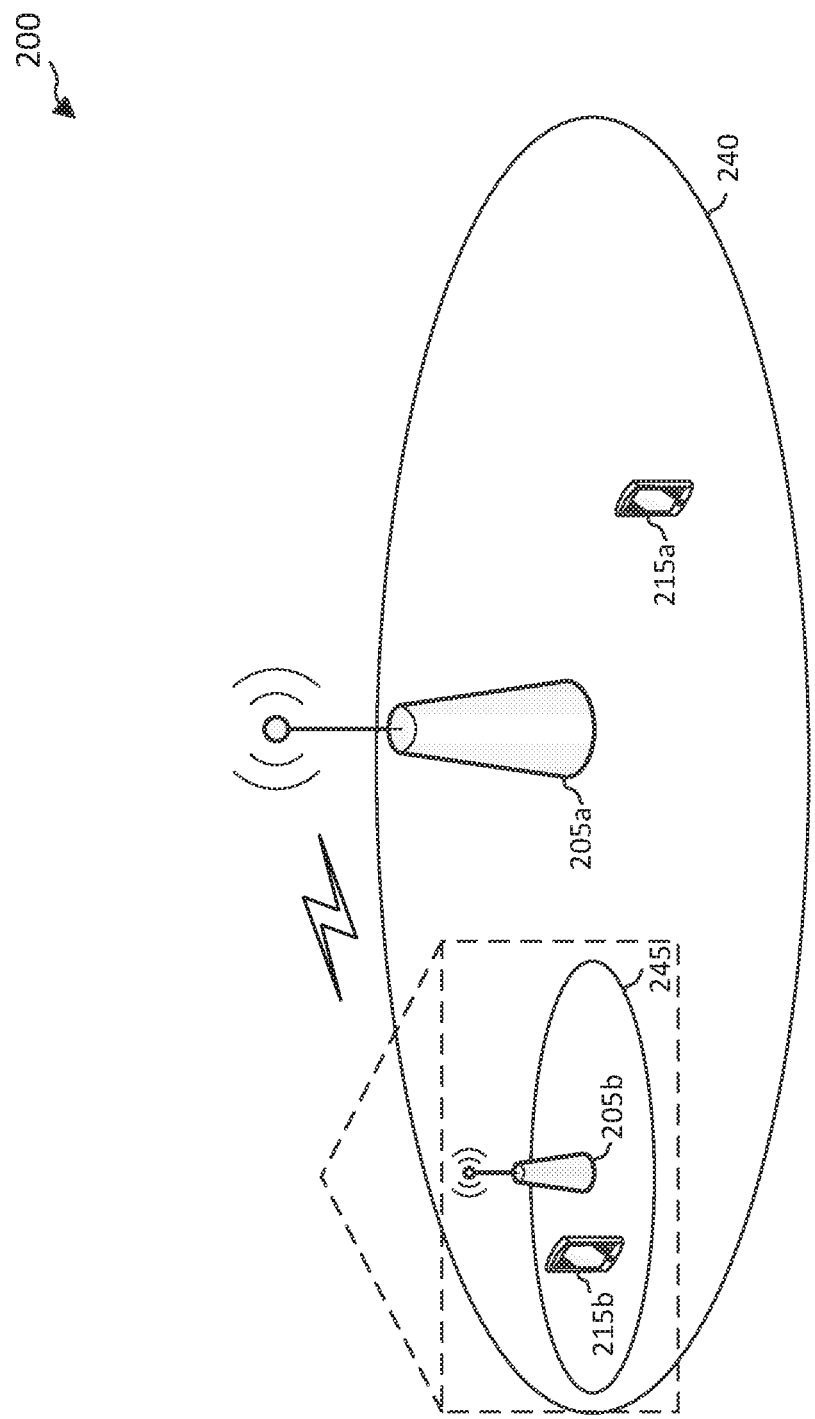
FIG. 2 illustrates an example of a wireless communications network including a macro cell and a pico cell accessing a spectrum according to embodiments of the present disclosure.

FIG. 2 illustrates an example of a wireless communications network 200 that supports priority-based spectrum sharing according to embodiments of the present disclosure. The network 200 may be similar to the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in a macro cell 240. The BS 205b serves the UEs 215b in a pico cell 245 within a coverage area of the macro cell 240. The BSs 205 and the UEs 215 may communicate over the same spectrum.

Due to the different transmission power requirements or power classes of nodes in the macro cell 240 and the pico cell 245, different power-class nodes may be treated as different network operating entities and assigned with different priorities for sharing the spectrum to minimize interference. For example, the BS 205a and the UE 215a may be treated as one network operating entity (e.g., Operator A), the BS 205b and the UE 215b may be treated as another network operating entity (e.g., Operator B). In the present disclosure, the terms network operating entity and operator may be used interchangeably and may be associated with a particular priority and/or a particular power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner. The claiming of the time periods for prioritized use or opportunistic use may be based on reservations. In addition, the BSs 205 and the UEs 215 may adjust transmission power levels and/or reservation detection thresholds to account for the different transmission power levels used by the different power classes, as described in greater detail herein.

Figure 3:
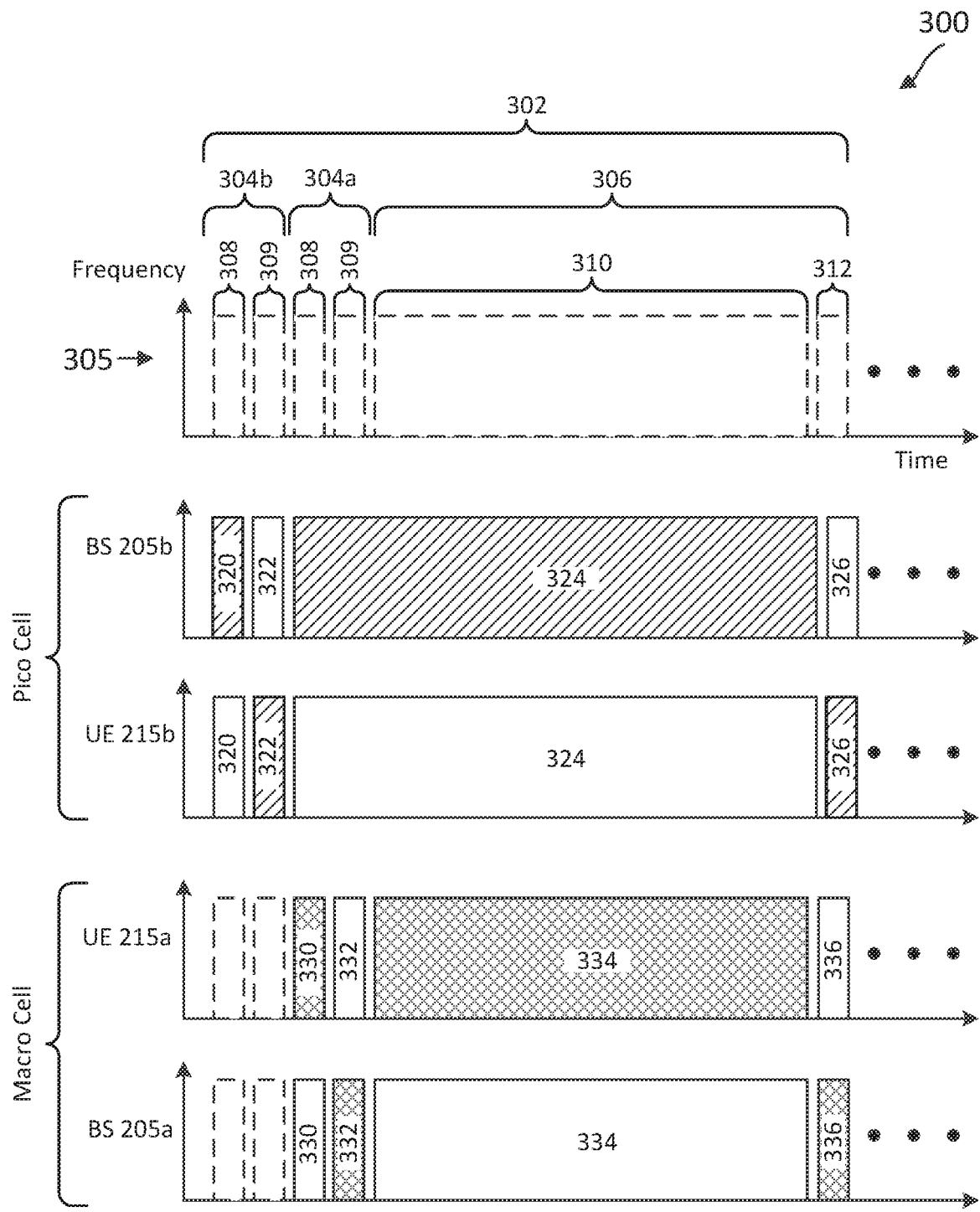
FIG. 3 illustrates an interference scenario between a high-power macro cell and a lower-power pico cell according to embodiments of the present disclosure.

FIG. 3 illustrates an interference scenario 300 between the high-power macro cell 240 and the lower-power pico cell 245 according to embodiments of the present disclosure. The x-axes represent time in some constant units. The y-axes represent frequency in some constant units. In the scenario 300, a spectrum is time-partitioned into a plurality of TXOP 302 as shown in the frame structure 305. The patterned boxes represent transmit signals and the empty boxes represent receive signals. The dashed boxes are included as references to the structure of the TXOP frame structure 305 without signal transmission or reception.

Each TXOP 302 includes a plurality of channel clear assessment (CCA) periods 304 followed by a transmission period 306. Each CCA period 304 is assigned to a particular network operating entity (e.g., the pico cell 245 or the macro cell 240) for transmitting reservation signals to reserve the following transmission period 306 for communications. Each CCA period 304 is divided into two portions 308 and 309, for example, for transmitting a reservation request (RRQ) signal and a reservation response (RRS) signal, respectively. The CCA periods 304 can be arranged in a decreasing order of priorities. Thus, a low priority operator node may yield channel (e.g., spectrum) access to a higher priority operator node. For example, a low priority operator node can listen to the channel during CCA periods 304 of higher priorities. Upon detection of an RRQ signal or an RRS signal from a higher priority operator node, the low priority operator node may refrain from transmitting in the following transmission period 306. The transmission period 306 can be used for UL and/or DL transmissions. For example, the transmission period 306 includes two portions 310 and 312. The portion 310 can have a longer duration than the portion 312. For DL-centric communications, the portion 310 can be assigned for DL transmissions and the portion 312 can be assigned for UL transmissions. Alternatively, for UL-centric communications, both the portions 310 and 312 can be assigned for UL transmissions.

As an example, the high priority CCA period 304b is assigned to the pico cell 245 and the low priority CCA period 304a is assigned to the macro cell 240. The BS 205b transmits an RRQ signal 320 in the portion 308 of the CCA period 304b to reserve the following transmission period 306, for example, for a DL-centric transmission. In response, the UE 215b transmits an RRS signal 322 in the portion 309 of the CCA period 304b. The RRQ signal 320 can be pre-determined preambles or request-to-send (RTS) signals. The RRS signal 322 can be pre-determined preambles or clear-to-send (CTS) signals. In some embodiments, the RRQ signal 320 can be a DL transmission trigger (e.g., a DL control signal carrying DL scheduling information) and the RRS signal 322 can be a SRS for channel sounding. Subsequently, the BS 205b communicates with the UE 215b in the transmission period 306. The transmission period 306 may begin after the CCA period 304b (e.g., occupying the low-priority CCA period 304a). The BS 205b transmits a DL data signal 324 in the portion 310, for example, based on the DL scheduling information. The DL signal 324 may carry DL data for the UE 215b. The UE 215b transmits an UL control signal 326 in the portion 310. The UL control signal 326 may carry a scheduling request (SR) and/or hybrid automatic repeat request (HARQ) information.

Since the macro cell 240 has a lower priority than the pico cell 245, the BS 205a and the UE 215a may monitor the channel during the CCA period 304b. As described above, the macro BS 205a may be a high-power node and the pico BS 205b may be a low-power node. As such, in some embodiments, the RRQ signal 320 and/or the RRS signal 322 may be too weak (e.g. low signal strengths) to be detected by the BS 205a. Thus, the BS 205a may incorrectly determine that the transmission period 306 is available and transmit an RRQ signal 330 in the portion 308 of the CCA period 304a to reserve the transmission period 306. Similarly, the RRQ signal 320 and/or the RRS signal 322 may be too weak to be detected by the UE 215a. Thus, the UE 215a may respond to the RRQ signal 330 by transmitting an RRS signal 332 in the portion 309 of the CCA period 304a. Alternatively, the BS 205a may detect the RRQ signal 320 and/or the RRS signal 322 with a signal strength sufficiently low (e.g., far away) and determine that a transmission from the BS 205a cannot cause significant interference. Thus, the BS 205a may also reserve the transmission period 306. Subsequently, the BS 205a may transmit a DL data signal 334 and the UE 215a may transmit an UL control signal 336 in the transmission period 306. As shown, the transmissions of the RRQ signal 330, the RRS signal 332, and the DL data signal 334 of the macro cell 240 overlap in time with the transmissions of the DL signal 324 in the pico cell 245, and thus may cause significant interference to the DL signal 324. Similarly, the transmission of the UL control signal 336 overlaps in time with the UL control signal 326, and thus may cause significant interference to the UL control signal 326.

Figure 4:
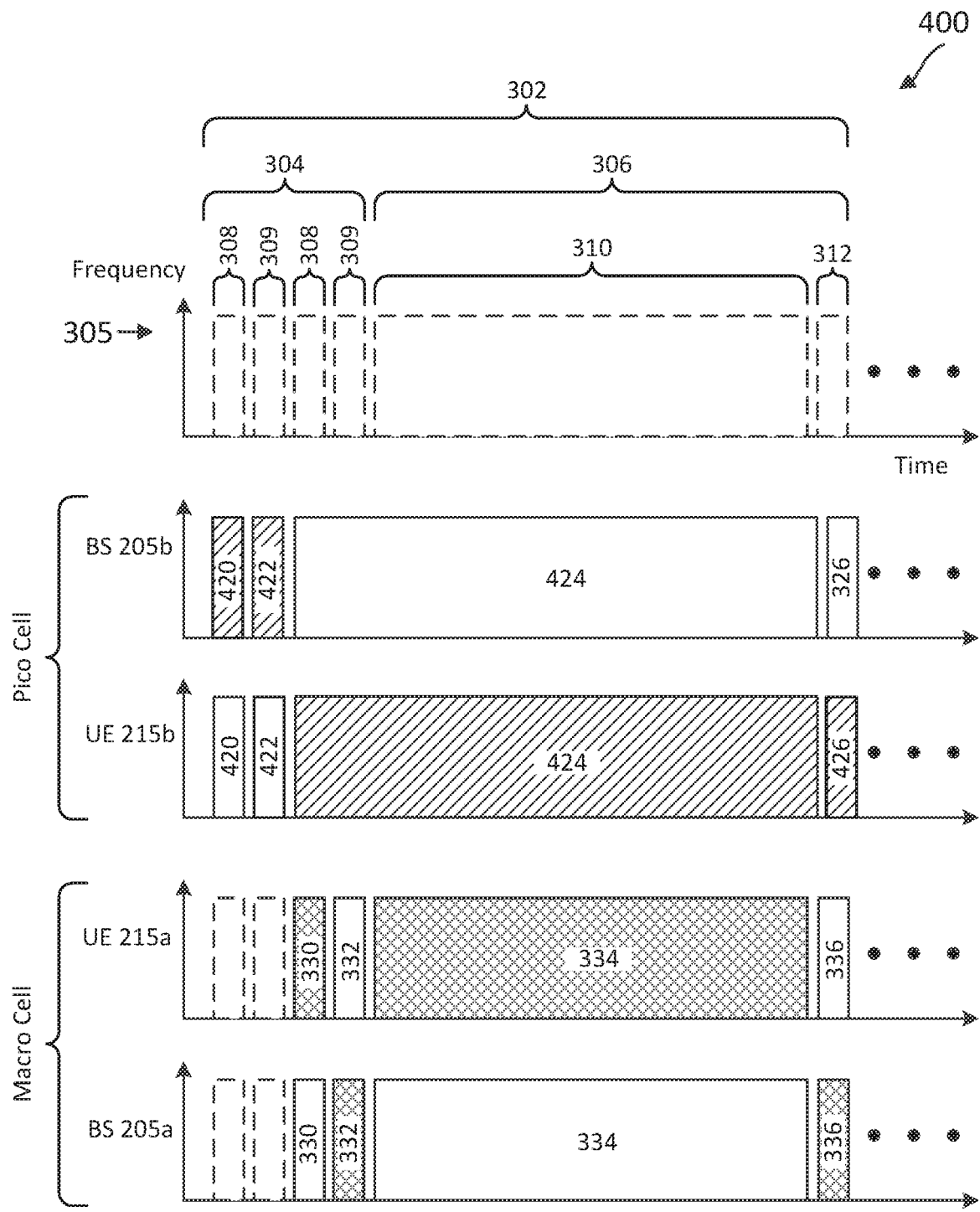
FIG. 4 illustrates an interference scenario between a high-power macro cell and a lower-power pico cell according to embodiments of the present disclosure.

FIG. 4 illustrates an interference scenario 400 between the high-power macro cell 240 and the lower-power pico cell 245 according to embodiments of the present disclosure. The scenario 400 is substantially similar to the scenario 300, but illustrates interference to an UL-centric transmission instead of a DL-centric transmission. As shown, in the CCA period 304b, the pico BS 205b transmits an RRQ signal 420 in the portion 308 and an RRS signal 422 in the portion 309 to indicate a reservation for the following transmission period 306. The RRQ signal 420 can be an UL transmission trigger, for example, a DL control signal carrying UL scheduling information. The RRS signal 422 can be a CSI-RS. Subsequently, the UE 215b transmits an UL signal 424 in the portion 310 of the transmission period 306, for example, based on the UL scheduling information and an UL control signal 426 in the portion 312 of the transmission period 306. Similar to the scenario 300, the BS 205a and the UE 215a may not detect the RRQ signal 420 and/or the RRS signal 422 due to weak signal strengths and proceed to reserve and communicate in the transmission period 306, causing significant interference to the transmissions of the BS 205b and the UE 215b.

Figure 5:
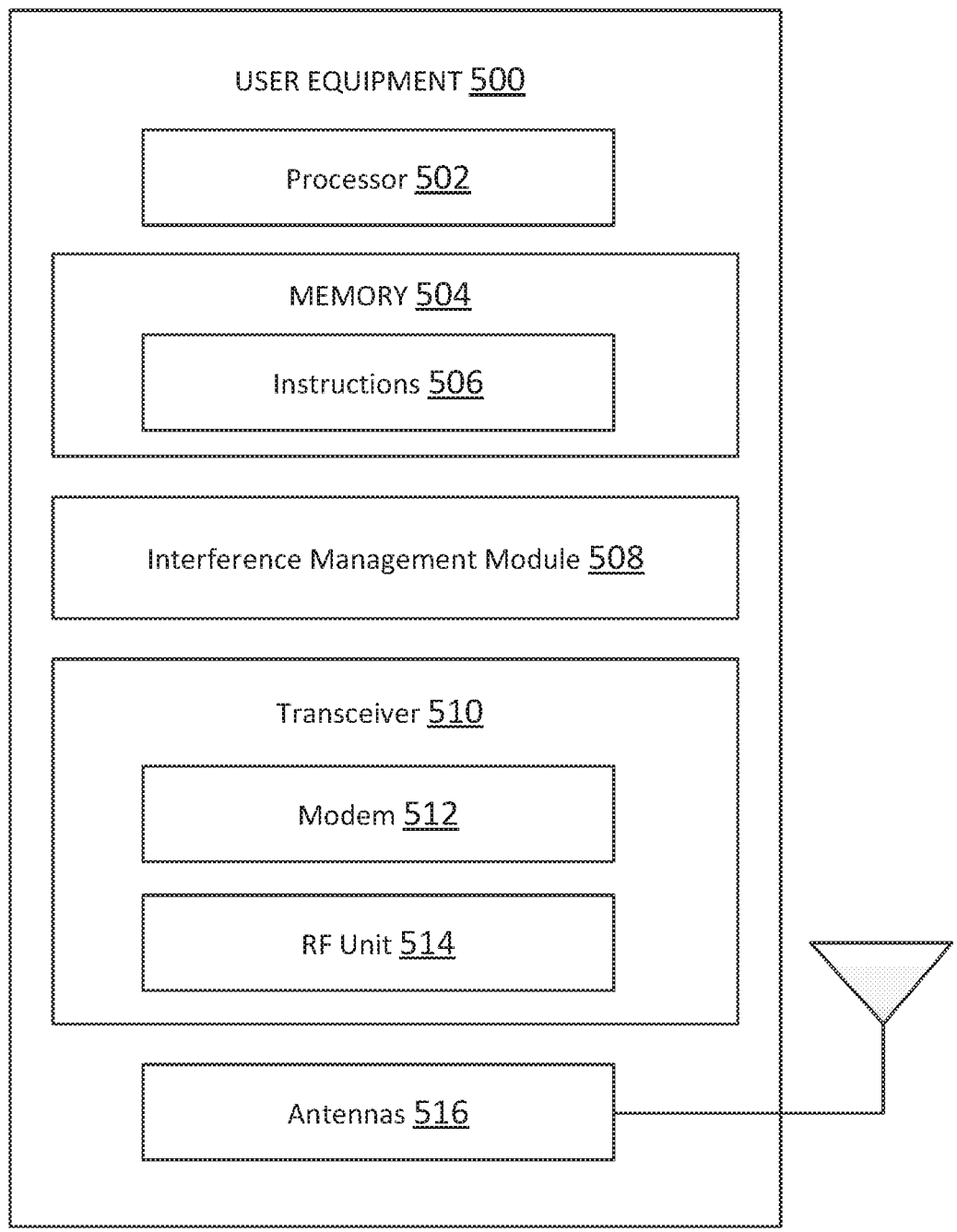
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 or 215 as discussed above. As shown, the UE 500 may include a processor 502, a memory 504, an interference management module 508, a transceiver 510 including a modem subsystem 512 and a radio frequency (RF) unit 514, and an antenna 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The interference management module 508 may be used for various aspects of the present disclosure. For example, the interference management module 508 is configured to identify TXOPs (e.g., the TXOPs 302) in a spectrum, perform network listening, reserve time intervals in a spectrum, and/or determine transmission power levels and/or reservation signal detection thresholds based on priorities and power classes to facilitate priority-based spectrum access by network operating entities of different power classes, as described in greater detail herein.

As shown, the transceiver 510 may include the modem subsystem 512 and the RF unit 514. The transceiver 510 can be configured to communicate bi-directionally with other devices, such as the BSs 105 and 205. The modem subsystem 512 may be configured to modulate and/or encode the data from the memory 504 and/or the interference management module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215 or a BS 205. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of clear-to-send (CTS) signals according to embodiments of the present disclosure. The antenna 516 may further receive data messages transmitted from other devices. This may include, for example, reception of request-to-send (RTS) and/or CTS signals according to embodiments of the present disclosure. The antenna 516 may provide the received data messages for processing and/or demodulation at the transceiver 510. Although FIG. 5 illustrates antenna 516 as a single antenna, antenna 516 may include multiple antennas of similar or different designs in order to sustain multiple transmission links. The RF unit 514 may configure the antenna 516.

Figure 6:
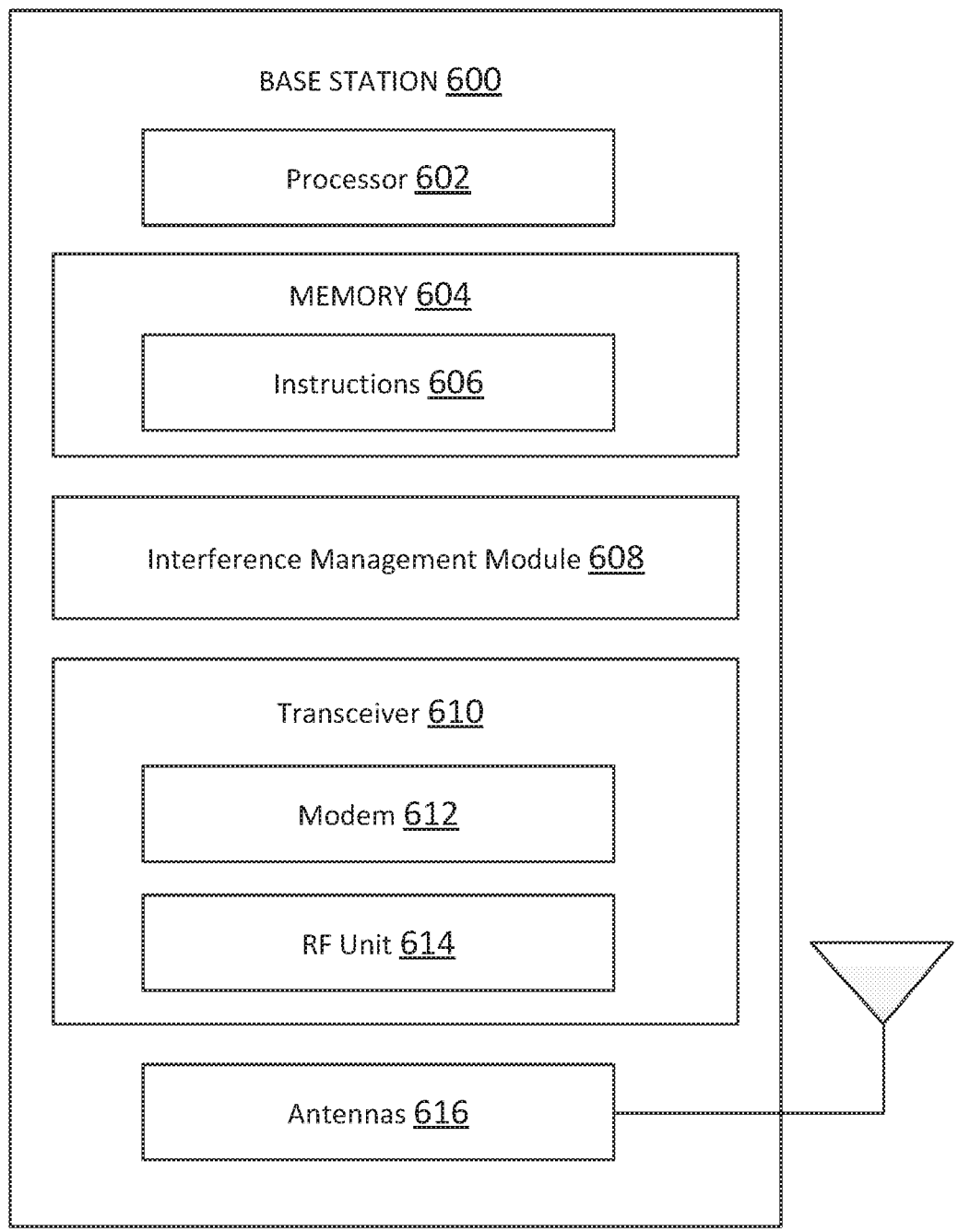
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 or 205 as discussed above. A shown, the BS 600 may include a processor 602, a memory 604, an interference management module 608, a transceiver 610 including a modem subsystem 612 and a RF unit 614, and an antenna 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The interference management module 608 may be used for various aspects of the present disclosure. For example, the interference management module 608 is configured to identify TXOPs (e.g., the TXOPs 302) in a spectrum, perform network listening, reserve time intervals in a spectrum, and/or determine transmission power levels and/or reservation signal detection thresholds based on priorities and power classes to facilitate priority-based spectrum access by network operating entities of different power classes, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 205 to enable the BS 205 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of information to complete attachment to a network and communication with a camped UE 215 according to embodiments of the present disclosure. The antenna 616 may further receive data messages transmitted from other devices and provide the received data messages for processing and/or demodulation at the transceiver 610. Although FIG. 6 illustrates antenna 616 as a single antenna, antenna 616 may include multiple antennas of similar or different designs in order to sustain multiple transmission links.

Figure 7:
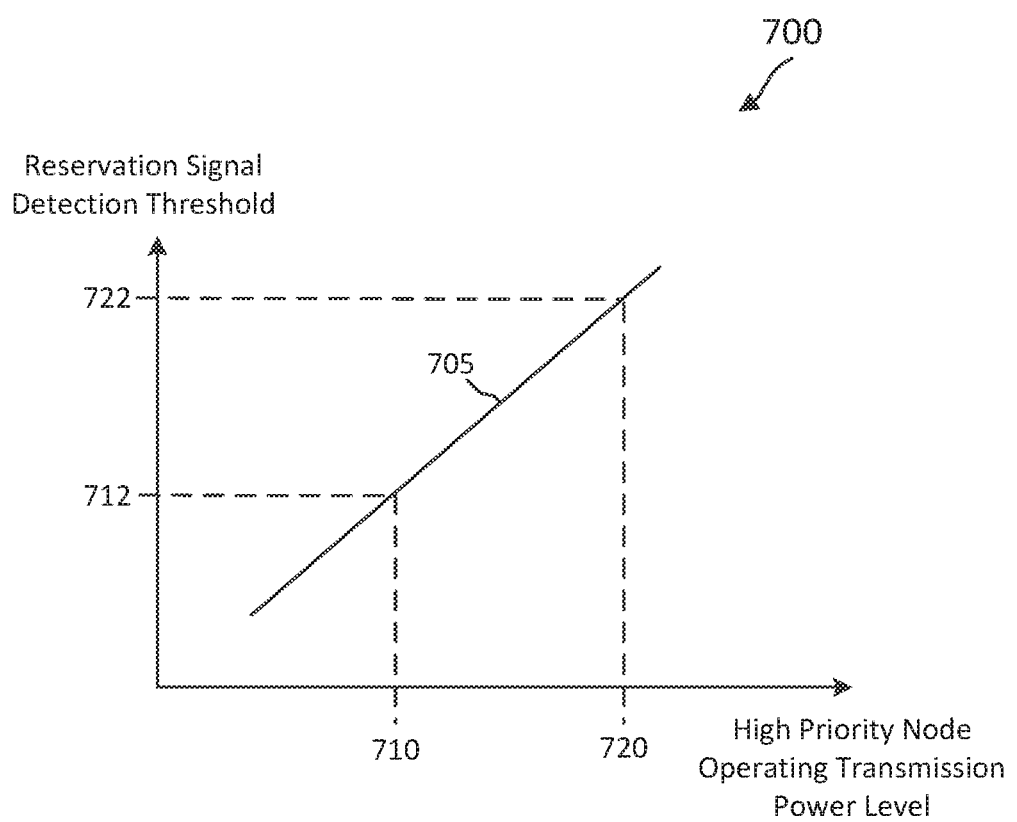
FIG. 7 illustrates a reservation signal detection threshold configuration scheme for interference management according to embodiments of the present disclosure.

FIG. 7 illustrates a reservation signal detection threshold configuration scheme 700 for interference management according to embodiments of the present disclosure. The x-axis represents operating transmission power levels of high priority operator nodes in some constant units, and the y-axis represents reservation signal detection thresholds in some constant units. The scheme 700 may be employed by the BSs 105, 205, and 600 and the UEs 115, 215, and 500. The scheme 700 is based on the frame structure 305 shown in FIG. 3. The BSs and the UEs may employ similar mechanisms to reserve and communicate in a TXOP 302 as in the scenario 300. However, in the scheme 700, a low priority node may determine the presence of reservation signals (e.g., the RRQ signals 320, 330, and 420 and the RRS signals 322, 332, and 422) from high priority nodes by selecting a reservation signal detection threshold based on the operating transmission power level of the high priority nodes, for example, as shown by the line 705. While the line 705 illustrates the relation between the reservation signal detection thresholds and the high priority node transmission power levels as a linear function, the relation can be of any suitable function.

As described above, macro nodes (e.g., the BS 205a and UE 215a) transmit at a higher power level than pico nodes (e.g., the BS 205b and UE 215b). As an example, macro nodes transmit at an operating transmission power level 720, while pico nodes transmit at a lower operating transmission power level 710. When a low priority node monitors for reservation signals from high priority macro nodes, the low priority node may set the reservation signal detection threshold to a high threshold value 722 according to the line 705. Conversely, when the low priority node monitors for reservation signals from high priority pico nodes, the low priority node may set the reservation signal detection threshold to a lower threshold value 712 according to the line 705. By reducing the reservation signal detection threshold for pico nodes (e.g., with low transmission power), the detectability of reservation signals from the pico nodes can be improved. Thus, the scheme 700 can reduce interference from macro cells (e.g., the macro cell 240) to pico cells (e.g., the pico cell 245) shown in the scenarios 300 and 400. The signaling of information associated with the operating transmission power levels is described in greater detail herein.

Figure 8:
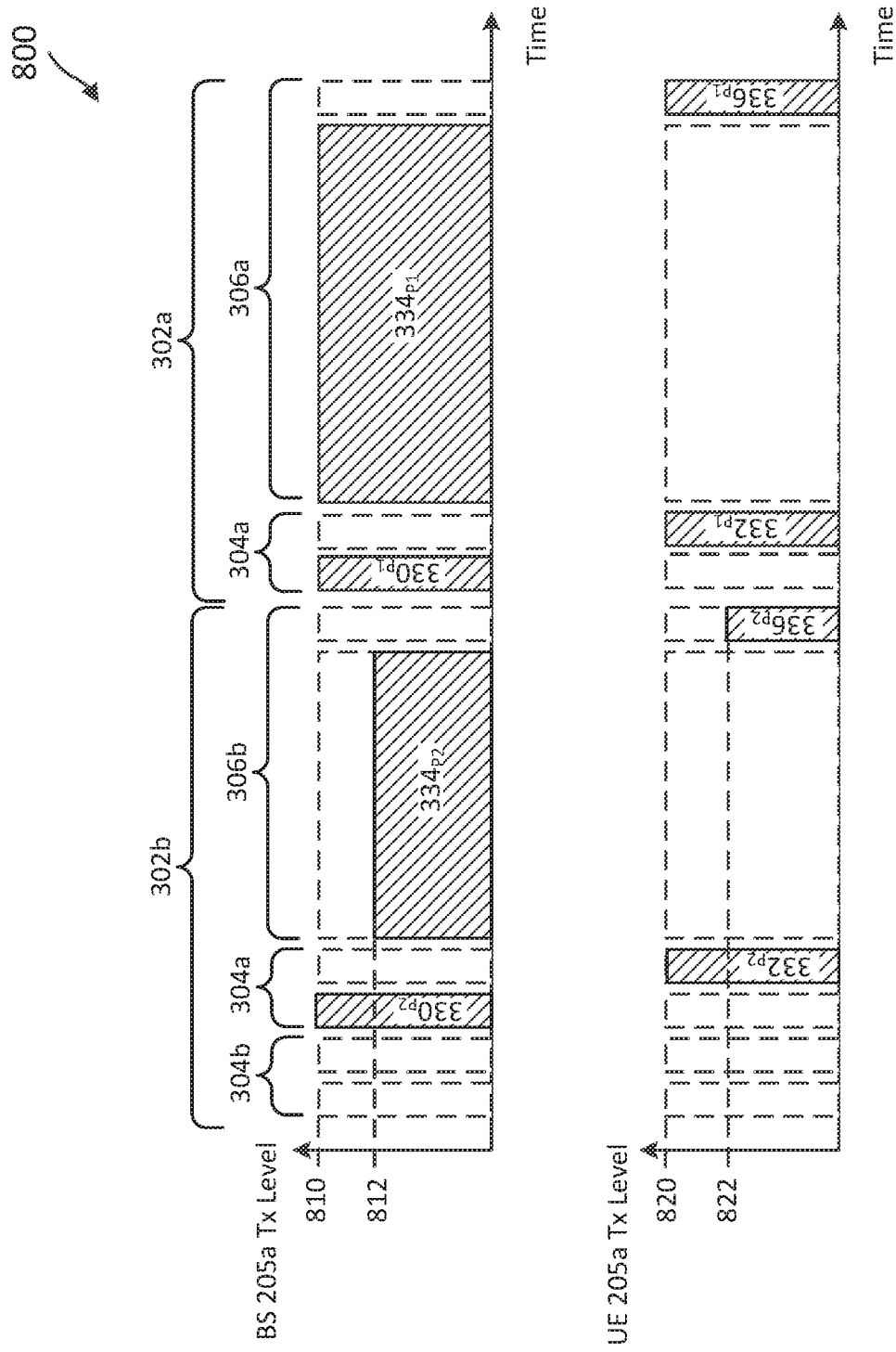
FIG. 8 illustrates a transmission power level configuration scheme for interference management according to embodiments of the present disclosure.
Figure 9:
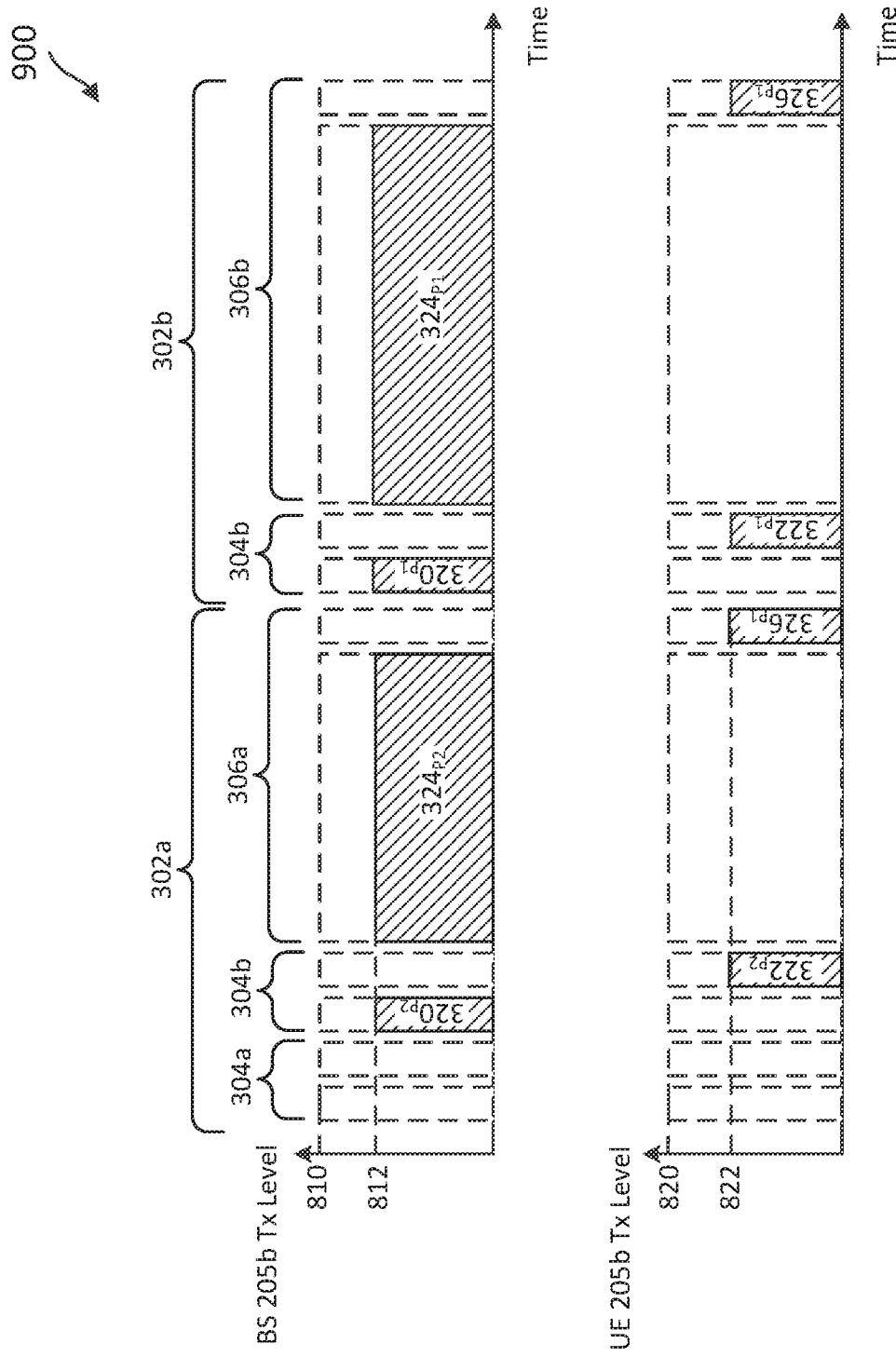
FIG. 9 illustrates a transmission power level configuration scheme for interference management according to embodiments of the present disclosure.

FIGS. 8 and 9 illustrate transmission power level adjustment mechanisms that may be employed by the BSs 105, 205, and 600 and the UEs 115, 215, and 500 to reduce interference from macro cells to pico cells. In FIGS. 8 and 9, the x-axes represent time in some constant units, and the y-axes represent transmission power level in some constant units. While FIGS. 8 and 9 illustrate two operators (e.g., macro Operator A and pico Operator B), similar mechanisms can be applied to any suitable number of operators and/or any combinations of high power class operators and low power class operators.

FIG. 8 illustrates a transmission power level configuration scheme 800 for interference management according to embodiments of the present disclosure. The scheme 800 is based on the frame structure 305 shown in FIG. 3. The BSs and the UEs may employ similar mechanisms to reserve and communicate in a TXOP 302 as in the scenario 300. However, in the scheme 800, when a low priority node opportunistically accesses a TXOP 302, the low priority node transmits at a transmission power level that is comparable to the operating transmission power level of the high priority nodes. The scheme 800 shows two TXOPs 302b and 302a, where Operator B (e.g., the pico BS 205b and the UE 215b) has priority in the TXOP 302b and Operator A (e.g., the macro BS 205a and the UE 215a) has priority in the TXOP 302a. As an example, the operating transmission power levels of the BS 205a, the BS 205b, the UE 215a, and the UE 215b are at levels 810, 812, 820, and 822, respectively.

For opportunistic access in the TXOP 302b, the BS 205a and the UE 215a may monitor for reservation signals (e.g., the RRQ signals 320 and 420 and the RRS signals 322 and 422) from Operator B in the high priority CCA period 304b of the TXOP 302b. For example, the BS 205a and the UE 215a did not detect any reservation signal from Operator B. Thus, the BS 205a may transmit an RRQ signal $330_{P2}$ in the assigned CCA period 304a for DL communication with the UE 215a. The UE 215a may respond with an RRS signal $332_{P2}$ in the assigned CCA period 304a. As shown, the BS 205a transmits the RRQ signal $330_{P2}$ at the operating transmission power level 810, and the UE 215a transmits the RRS signal $332_{P2}$ at the operating transmission power level 820.

After receiving the RRS signal $332_{P2}$, the BS 205a may determine a transmission power level for communicating in the transmission period 306b based on the operating transmission power level of the high priority Operator B. As shown, the BS 205a transmits a DL data signal $334_{P2}$ at a reduced transmission power level 812, which may be comparable to the operating transmission power level of the high priority pico Operator B. Similarly, the UE 215a may determine a transmission power level for communicating in the transmission period 306b based on the operating transmission power level of the high priority Operator B. As shown, the UE 215a transmits an UL control signal $336_{P2}$ at a reduced transmission power level 822, which may be comparable to the operating transmission power level of the high priority pico Operator B. Note that typically UEs transmit at a relatively lower power compared to BSs. Thus, low priority nodes can determine a corresponding transmission power level or RRS detection threshold as a function of a high priority BS transmission power level, a high priority UE transmission power level, or both.

When the high priority operator is of a lower power class than the low priority operator, the low priority nodes may not detect low-power reservation signals from the high priority operator. Thus, opportunistic transmission of the low priority operator can occur simultaneously as the prioritized transmission of the high priority operator, for example, in the transmission period 306. By reducing the transmission power level of opportunistic transmission to a level similar to or lower than the transmission power level of the prioritized transmission, interference from the opportunistic transmission to the prioritized transmission may be reduced. In an embodiment, a low priority node can determine a transmission power level for an opportunistic transmission by selecting a minimum power level of operating transmission power levels of all higher priority operators and the low priority node.

For prioritized access in the TXOP 302a, the BS 205a and the UE 215a may communicate without adjusting or reducing transmission power levels from corresponding operating transmission power levels 810 and 820, respectively. As shown, the BS 205a transmits an RRQ signal $330_{P1}$ at the transmission power level 810 and the UE 215a responds with an RRS signal $332_{P1}$ at the transmission power level 820. Subsequently, the BS 205a transmits a DL data signal $334_{P1}$ at the operating transmission power level 810 and the UE 215a may transmit an UL control signal $336_{P1}$ at the transmission power level 820. While the scheme 800 is described in the context of DL-centric communication, the scheme 800 can be applied for UL-centric communication.

FIG. 9 illustrates a transmission power level configuration scheme 900 for interference management according to embodiments of the present disclosure. The scheme 900 is based on the frame structure 305 shown in FIG. 3. The BSs and the UEs may employ similar mechanisms to reserve and communicate in a TXOP 302 as in the scenario 300. The scheme 900 is similar to the scheme 800, but illustrates transmission power level configuration at pico nodes (e.g., the BS 205b and the UE 215b). The BS 205b and the UE 215b may employ similar mechanisms as the BS 205a and the UE 215a to determine a transmission power level for prioritized access or opportunistic access.

For opportunistic access in the TXOP 302a, the BS 205b may transmit an RRQ signal $320_{P2}$ and the UE 215b may respond with an RRS signal $322_{P2}$ during the assigned CCA period 304a. Since the BS 205b and the UE 215b are of a lower power class than the high priority Operator A, the BS 205b may transmit a DL data signal $324_{P2}$ at the operating transmission power level 812 of the BS 205b and the UE 215b may transmit an UL control signal $326_{P2}$ at the operating transmission power level 822 of the UE 215b during the transmission period 306b.

For prioritized access in the TXOP 302b, the BS 205b may transmit an RRQ signal $320_{P1}$ and the UE 215b may respond with an RRS signal $322_{P1}$ during the assigned CCA period 304b. The BS 205b may transmit a DL data signal $324_{P1}$ at the operating transmission power level 812 of the BS 205b and the UE 215b may transmit an UL control signal $326_{P1}$ at the operating transmission power level 822 of the UE 215b during the transmission period 306b. While the scheme 900 is described in the context of DL-centric communication, the scheme 900 can be applied to UL-centric communication.

Figure 10:
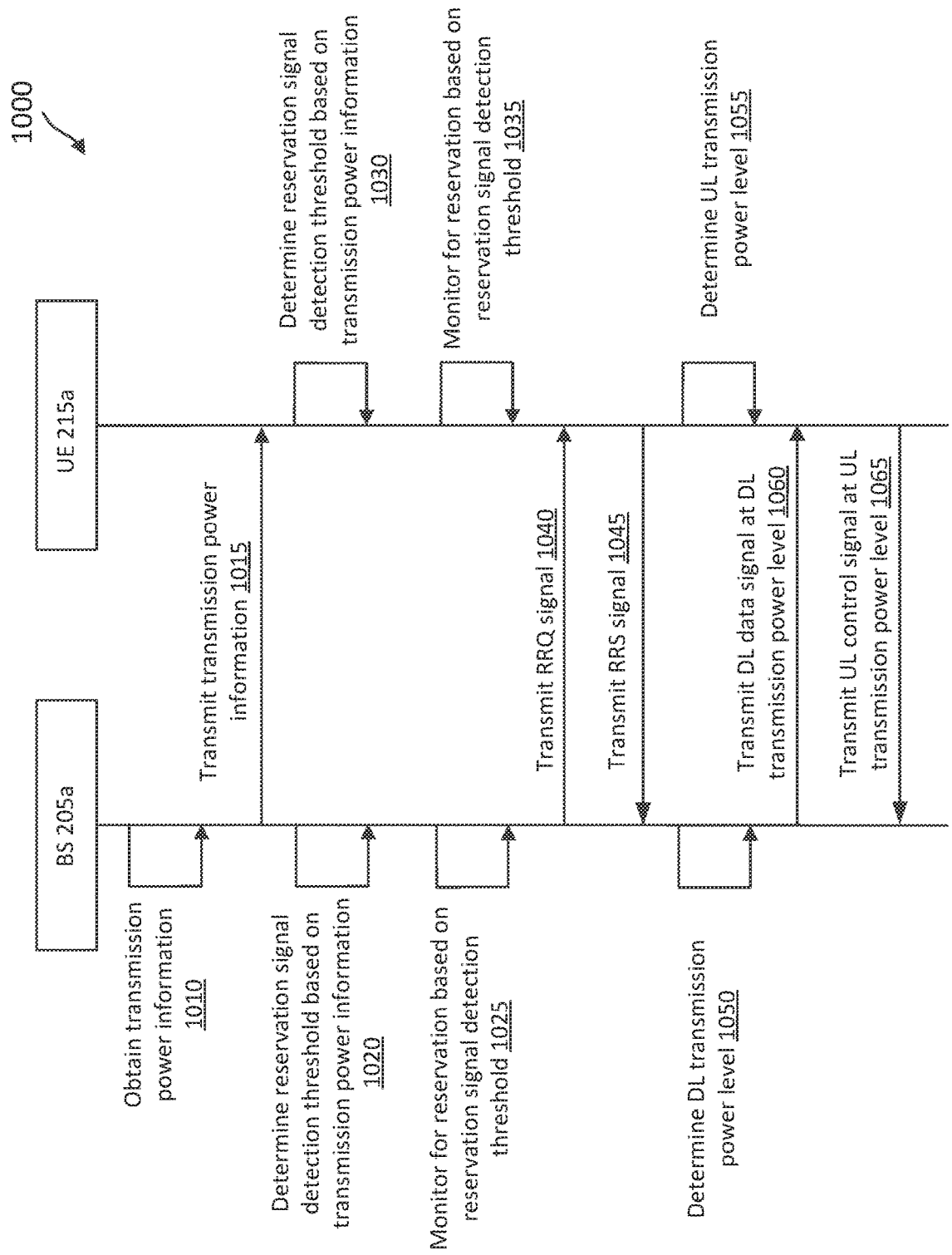
FIG. 10 illustrates a signaling diagram of an interference management method according to embodiments of the present disclosure.

FIG. 10 illustrates a signaling diagram of an interference management method 1000 according to embodiments of the present disclosure. Steps of the method 1000 can be executed by a computing device (e.g., a processor, processing circuit, and/or other suitable component) of a wireless communication device, such as the BSs 105, 205, and 600 and the UEs 115, 215, and 500. The method 1000 may employ similar mechanisms as in the schemes 700, 800, and 900 described with respect to FIGS. 7, 8, and 9. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

As described above in the schemes 700, 800, and 900, low priority nodes may determine reservation signal detection thresholds and/or transmission power levels based on power classes and/or operating transmission power levels of higher priority operators. Thus, the schemes 700, 800, and 900 require an operator node to have the knowledge of the priorities of other operators (e.g., CCA periods 304 assignment) in a TXOP 302 and operating transmission power levels of the operators. The method 1000 illustrates transmission power information signaling mechanisms that may be used in conjunction with the schemes 700, 800, and/or 900.

As an example, Operator B (e.g., the pico cell 245) has priority over Operator A (e.g., the macro cell 240) in a particular TXOP 302, where Operator B is assigned with a high priority CCA period 304b and Operator A is assigned with a low priority CCA period 304a in the TXOP 302. At step 1010, the BS 205a may obtain transmission power information associated with operators (e.g., Operator B) sharing the same spectrum. In an embodiment, the BS 205a may receive the transmission power information from a central authority (e.g., a SAS) of the network via a backhaul link (e.g., the backhaul link 132). The transmission power information may indicate power classes (e.g., a macro power class and/or a pico power class) of the operators and/or associated operating transmission power levels (e.g., the operating transmission power levels 710, 720, 810, 812, 820, and 822).

At step 1015, the BS 205a may transmit the transmission power information to the UE 205a. For example, the BS 205a may distribute the transmission power information to all UEs served by the BS 205a.

At step 1020, the BS 205a may determine a reservation signal detection threshold (e.g., the reservation signal detection threshold 712) based on the transmission power information, for example, by employing the scheme 700. At step 1025, the BS 205a may monitor for reservation signals (e.g., the RRQ signals 320, 330, and 420 and/or the RRS signals 322, 332, and/or 422) from Operator B in the CCA period 304b based on the determined reservation detection threshold.

Similarly, at step 1030, the UE 215a may determine a reservation detection threshold based on the received transmission power information. At step 1035, the UE 215a may monitor for reservation signals from Operator B in the CCA period 304b based on the determined reservation detection threshold.

At step 1040, when there is no reservation signal detected in the CCA period 304b, the BS 205a may transmit an RRQ signal (e.g., the RRQ signal 330) to reserve the TXOP 302. For example, the RRQ signal may indicate a DL transmission trigger. At step 1045, when there is no reservation signal detected in the CCA period 304b, the UE 215a may transmit an RRS signal (e.g., the RRQ signal 332).

At step 1050, the BS 205a may determine a DL transmission power level based on the transmission power information, for example, by employing the scheme 800. Similarly, at step 1055, the UE 215a may determine an UL transmission power level based on the transmission power information, for example, by employing the scheme 800 or 900.

At step 1060, the BS 205a may transmit a DL data signal (e.g., the DL data signal 324) at the determined DL transmission power level during a transmission period 306 of the TXOP 302. At step 1065, the UE may transmit an UL control signal (e.g., the UL control signal 326) at the determined UL transmission power level during the transmission period 306. While the method 1000 illustrates the employment of both schemes 700 and 800, the method 1000 can employ any suitable combination of the schemes 700, 800, and 900.

Figure 11:
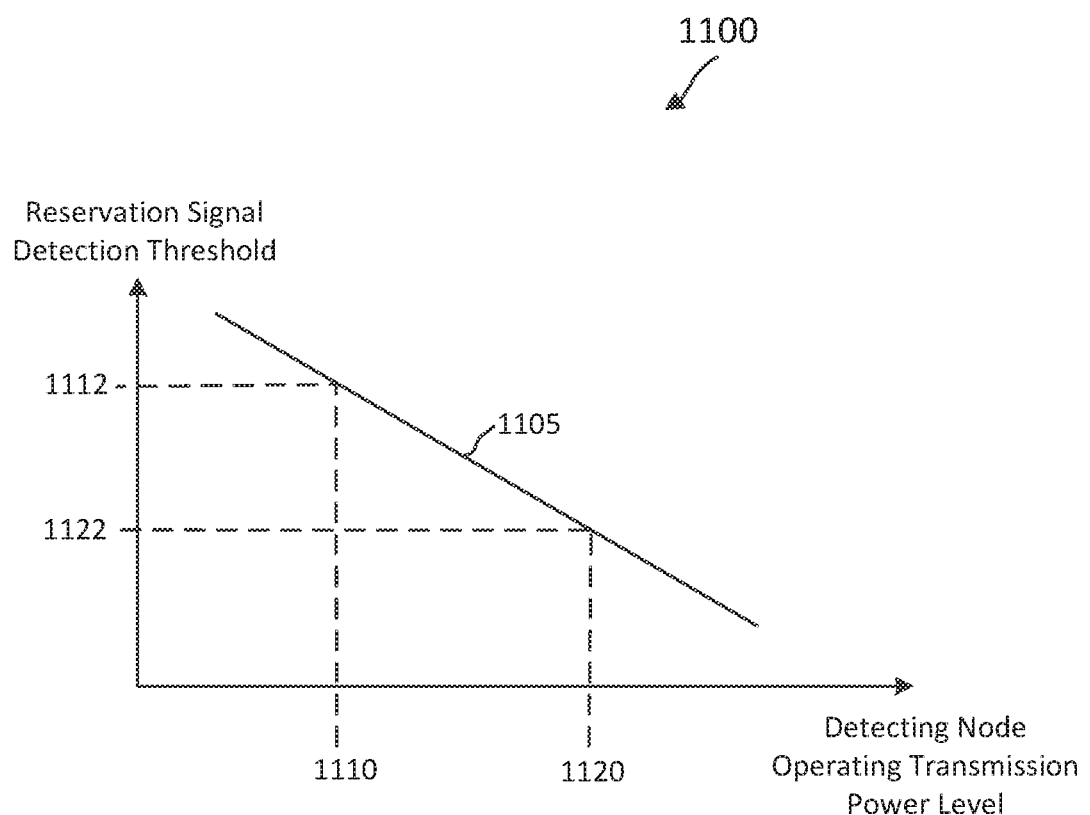
FIG. 11 illustrates a reservation signal detection threshold configuration scheme for interference management according to embodiments of the present disclosure.

FIG. 11 illustrates a reservation signal detection threshold configuration scheme 1100 for interference management according to embodiments of the present disclosure. The x-axis represents operating transmission power levels of detecting nodes in some constant units, and the y-axis represents reservation signal detection thresholds in some constant units. The scheme 1100 may be employed by the BSs 105, 205, and 600 and the UEs 115, 215, and 500. The scheme 1100 is based on the frame structure 305 shown in FIG. 3. The BSs and the UEs may employ similar mechanisms to reserve and communicate in a TXOP 302 as in the scenario 300. However, in the scheme 1100, a low priority node may determine the presence of reservation signals (e.g., the RRQ signals 320, 330, and 420 and the RRS signals 322, 332, and 422) from high priority nodes by selecting a reservation signal detection threshold based on the operating transmission power level of the low priority node, for example, as shown by the line 1105. In an embodiment, the relation between the reservation signal detection thresholds and the low priority node (e.g., the detecting node) transmission power levels is an inverse function as shown in FIG. 11. In other embodiments, the relation can be of any suitable function. In contrast to the scheme 700, the scheme 1110 does not require knowledge of power classes and/or operating transmission power levels of high priority operators.

As an example, macro nodes (e.g., the BS 205a and the UE 215a) transmit at an operating transmission power level 1120, while pico nodes transmit at a lower operating transmission power level 1110. When a low priority macro node monitors for reservation signals from high priority nodes, the low priority macro node may set the reservation signal detection threshold to a low threshold value 1122 (e.g., inversely proportional to the macro operating transmission power level) according to the line 1105. Conversely, when a low priority pico node monitors for reservation signals from high priority nodes, the low priority pico node may set the reservation signal detection threshold to a high threshold value 1112 (e.g., inversely proportional to the pico operating transmission power level) according to the line 1105.

In some embodiments, a low priority node may determine a maximum allowable transmission power level based on reception powers of reservations signals (e.g., the RRQ signals 320, 330, and 420 and the RRS signals 322, 332, and 422) at the low priority nodes. In some embodiments, a macro node may use an increased reservation signal detection threshold, but may transmit at a reduced transmission power level.

Figure 12:
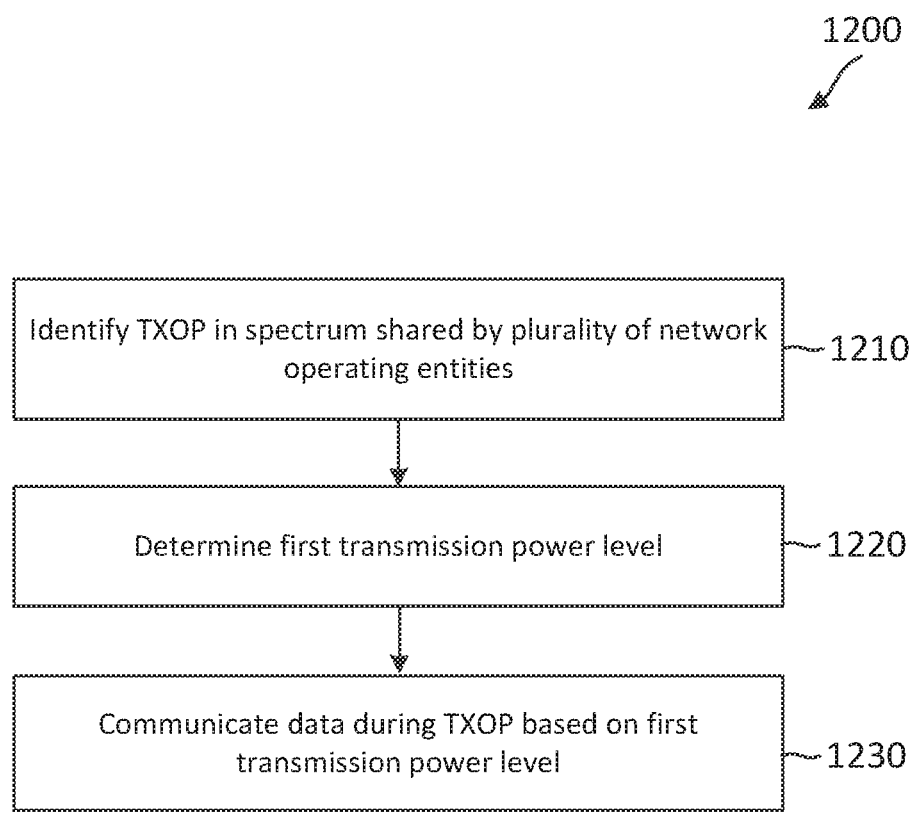
FIG. 12 is a flow diagram of a method of managing interference among communications of multiple network operating entities over a spectrum according to embodiments of the present disclosure.

FIG. 12 is a flow diagram of a method 1200 of managing interference among communications of multiple network operating entities over a spectrum according to embodiments of the present disclosure. Steps of the method 1200 can be executed by a computing device (e.g., a processor, processing circuit, and/or other suitable component) of a wireless communication device, such as the BSs 105, 205, and 600 and the UEs 115, 215, and 500. The method 1200 may employ similar mechanisms as in the schemes 700, 800, 900, and 1100 and the method 1000 described with respect to FIGS. 7, 8, 9, 11, and 10, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes identifying, a TXOP (e.g., the TXOPs 302) in a spectrum shared by a plurality of network operating entities (e.g., macro Operator A and pico Operator B). For example, the wireless communication device is associated with a first network operating of the plurality of network operating entities.

At step 1220, the method 1200 includes determining a first transmission power level (e.g., the transmission power levels 810, 812, 820, and 822), for example, by employing the schemes 800 or 900.

At step 1230, the method 1200 includes communicating data with a second wireless communication device associated with the first network operating entity during the TXOP based on the first transmission power level.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising identifying, by a first wireless communication device associated with a first network operating entity of a plurality of network operating entities, a transmission opportunity (TXOP) in a spectrum shared by the plurality of network operating entities; determining, by the first wireless communication device, a first transmission power level; and communicating, by the first wireless communication device with a second wireless communication device associated with the first network operating entity based on the first transmission power level, data during the TXOP.

The method further includes wherein the first transmission power level is determined based on at least power classes of one or more of the plurality of network operating entities. The method further includes wherein each of the power classes is associated with an operating transmission power level. The method further includes receiving, by the first wireless communication device, transmission power information associated with at least one of the plurality of network operating entities. The method further includes transmitting, by the first wireless communication device to the second wireless communication device, the transmission power information associated with at least one of the plurality of network operating entities. The method further includes wherein the transmission power information indicates an operating transmission power level of a second network operating entity of the plurality of network operating entities. The method further includes wherein the second network operating entity has priority over the first network operating entity in the TXOP, and wherein the first transmission power level is determined further based on an operating transmission power level of the first network operating entity and the operating transmission power level of the second network operating entity. The method further includes wherein the first transmission power level is determined further based on a minimum power level of the operating transmission power level of the first network operating entity and the operating transmission power level of the second network operating entity. The method further includes determining, by the first wireless communication device, a reservation signal detection threshold based on the operating transmission power level of the second network operating entity; and monitoring, by the first wireless communication device in a channel sensing period of the TXOP, for a reservation signal for the TXOP from the second network operating entity based on the reservation signal detection threshold. The method further includes wherein the determining the reservation signal detection threshold includes: assigning a first value to the reservation signal detection threshold when the second network operating entity is of a first power class; and assigning a second value to the reservation signal detection threshold when the second network operating entity is of a second power class, wherein the second power class is a lower power class than the first power class, and wherein the second value is less than the first value. The method further includes determining, by the first wireless communication device, a reservation signal detection threshold based on an operating transmission power level of the first network operating entity; and monitoring, by the first wireless communication device in a channel sensing period of the TXOP, for a reservation signal for the TXOP from a second network operating entity of the plurality of network operating entities based on the reservation signal detection threshold. The method further includes wherein the reservation signal detection threshold is determined further based on an inverse of the operating transmission power level of the first network operating entity. The method further includes monitoring, by the first wireless communication device in a channel sensing period of the TXOP, for a reservation signal from a second network operating entity of the plurality of network operating entities, wherein the first transmission power level is determined further based on a reception power of the reservation signal. The method further includes wherein the first network operating entity has priority among the plurality of network operating entities during the TXOP, and wherein the first transmission power level is determined further based on an operating transmission power level of the first network operating entity.

Further embodiments of the present disclosure include an apparatus comprising a processor configured to identify, a transmission opportunity (TXOP) in a spectrum shared by a plurality of network operating entities, wherein the apparatus is associated with a first network operating entity of the plurality of network operating entities; and determine a first transmission power level; and a transceiver configured to communicate, with a second wireless communication device associated with the first network operating entity based on the first transmission power level, data during the TXOP.

The apparatus further includes where the first transmission power level is determined based on at least power classes of one or more of the plurality of network operating entities. The apparatus further includes wherein each of the power classes is associated with an operating transmission power level. The apparatus further includes wherein the transceiver is further configured to receive transmission power information associated with at least one of the plurality of network operating entities. The apparatus further includes wherein the transceiver is further configured to transmit, to the second wireless communication device, the transmission power information associated with at least one of the plurality of network operating entities. The apparatus further includes wherein the transmission power information indicates an operating transmission power level of a second network operating entity of the plurality of network operating entities. The apparatus further includes wherein the second network operating entity has priority over the first network operating entity in the TXOP, and wherein the first transmission power level is determined further based on an operating transmission power level of the first network operating entity and the operating transmission power level of the second network operating entity. The apparatus further includes wherein the first transmission power level is determined further based on a minimum power level of the operating transmission power level of the first network operating entity and the operating transmission power level of the second network operating entity. The apparatus further includes wherein the processor is further configured to determine a reservation signal detection threshold based on the operating transmission power level of the second network operating entity; and monitor, in a channel sensing period of the TXOP, for a reservation signal for the TXOP from the second network operating entity based on the reservation signal detection threshold. The apparatus further includes wherein the processor is further configured to determine the reservation signal detection threshold by assigning a first value to the reservation signal detection threshold when the second network operating entity is of a first power class; and assigning a second value to the reservation signal detection threshold when the second network operating entity is of a second power class, wherein the second power class is a lower power class than the first power class, and wherein the second value is less than the first value. The apparatus further includes wherein the processor is further configured to determine a reservation signal detection threshold based on an operating transmission power level of the first network operating entity; and monitor, in a channel sensing period of the TXOP, for a reservation signal for the TXOP from a second network operating entity of the plurality of network operating entities based on the reservation signal detection threshold. The apparatus further includes wherein the reservation signal detection threshold is determined further based on an inverse of the operating transmission power level of the first network operating entity. The apparatus further includes wherein the processor is further configured to monitor, in a channel sensing period of the TXOP, for a reservation signal from a second network operating entity of the plurality of network operating entities, and wherein the first transmission power level is determined further based on a reception power of the reservation signal. The apparatus further includes wherein the first network operating entity has priority among the plurality of network operating entities during the TXOP, and wherein the first transmission power level is determined further based on an operating transmission power level of the first network operating entity.

Further embodiments of the present disclosure include a computer-readable medium having program code recorded thereon, the program code comprising code for causing a first wireless communication device to identify a transmission opportunity (TXOP) in a spectrum shared by a plurality of network operating entities, wherein the first wireless communication device is associated with a first network operating entity of the plurality of network operating entities; code for causing the first wireless communication device to determine a first transmission power level; and code for causing the first wireless communication device to communicate, with a second wireless communication device associated with the first network operating entity based on the first transmission power level, data during the TXOP.

The computer-readable medium further includes where the first transmission power level is determined based on at least power classes of one or more of the plurality of network operating entities. The computer-readable medium further includes wherein each of the power classes is associated with an operating transmission power level. The computer-readable medium further includes code for causing the first wireless communication device to receive transmission power information associated with at least one of the plurality of network operating entities. The computer-readable medium further includes code for causing the first wireless communication device to transmit, to the second wireless communication device, the transmission power information associated with at least one of the plurality of network operating entities. The computer-readable medium further includes wherein the transmission power information indicates an operating transmission power level of a second network operating entity of the plurality of network operating entities. The computer-readable medium further includes wherein the second network operating entity has priority over the first network operating entity in the TXOP, and wherein the first transmission power level is determined further based on an operating transmission power level of the first network operating entity and the operating transmission power level of the second network operating entity. The computer-readable medium further includes wherein the first transmission power level is determined further based on a minimum power level of the operating transmission power level of the first network operating entity and the operating transmission power level of the second network operating entity. The computer-readable medium further includes code for causing the first wireless communication device to determine a reservation signal detection threshold based on the operating transmission power level of the second network operating entity; and code for causing the first wireless communication device to monitor, in a channel sensing period of the TXOP, for a reservation signal for the TXOP from the second network operating entity based on the reservation signal detection threshold. The computer-readable medium further includes wherein the code for determining the reservation signal detection threshold is further configured to assign a first value to the reservation signal detection threshold when the second network operating entity is of a first power class; and assign a second value to the reservation signal detection threshold when the second network operating entity is of a second power class, wherein the second power class is a lower power class than the first power class, and wherein the second value is less than the first value. The computer-readable medium further includes code for causing the first wireless communication device to determine a reservation signal detection threshold based on an operating transmission power level of the first network operating entity; and code for causing the first wireless communication device to monitor, in a channel sensing period of the TXOP, for a reservation signal for the TXOP from a second network operating entity of the plurality of network operating entities based on the reservation signal detection threshold. The computer-readable medium further includes wherein the reservation signal detection threshold is determined further based on an inverse of the operating transmission power level of the first network operating entity. The computer-readable medium further includes code for causing the first wireless communication device to monitor, in a channel sensing period of the TXOP, for a reservation signal from a second network operating entity of the plurality of network operating entities, wherein the first transmission power level is determined further based on a reception power of the reservation signal. The computer-readable medium further includes wherein the first network operating entity has priority among the plurality of network operating entities during the TXOP, and wherein the first transmission power level is determined further based on an operating transmission power level of the first network operating entity.

Further embodiments of the present disclosure include an apparatus comprising means for identifying a transmission opportunity (TXOP) in a spectrum shared by a plurality of network operating entities, wherein the apparatus is associated with a first network operating entity of the plurality of network operating entities; means for determining a first transmission power level; and means for communicating, with a second wireless communication device associated with the first network operating entity based on the first transmission power level, data during the TXOP.

The apparatus further includes wherein the first transmission power level is determined based on at least power classes of one or more of the plurality of network operating entities. The apparatus further includes wherein each of the power classes is associated with an operating transmission power level. The apparatus further includes means for receiving transmission power information associated with at least one of the plurality of network operating entities. The apparatus further includes means for transmitting, to the second wireless communication device, the transmission power information associated with at least one of the plurality of network operating entities. The apparatus further includes wherein the transmission power information indicates an operating transmission power level of a second network operating entity of the plurality of network operating entities. The apparatus further includes wherein the second network operating entity has priority over the first network operating entity in the TXOP, and wherein the first transmission power level is determined further based on an operating transmission power level of the first network operating entity and the operating transmission power level of the second network operating entity. The apparatus further includes wherein the first transmission power level is determined further based on a minimum power level of the operating transmission power level of the first network operating entity and the operating transmission power level of the second network operating entity. The apparatus further includes means for determining a reservation signal detection threshold based on the operating transmission power level of the second network operating entity; and means for monitoring, in a channel sensing period of the TXOP, for a reservation signal for the TXOP from the second network operating entity based on the reservation signal detection threshold. The apparatus further includes wherein the means for determining the reservation signal detection threshold is further configured to assign a first value to the reservation signal detection threshold when the second network operating entity is of a first power class; and assign a second value to the reservation signal detection threshold when the second network operating entity is of a second power class, wherein the second power class is a lower power class than the first power class, and wherein the second value is less than the first value. The apparatus further includes means for determining a reservation signal detection threshold based on an operating transmission power level of the first network operating entity; and means for monitoring, in a channel sensing period of the TXOP, for a reservation signal for the TXOP from a second network operating entity of the plurality of network operating entities based on the reservation signal detection threshold. The apparatus further includes wherein the reservation signal detection threshold is determined further based on an inverse of the operating transmission power level of the first network operating entity. The apparatus further includes means for monitoring, in a channel sensing period of the TXOP, for a reservation signal from a second network operating entity of the plurality of network operating entities, wherein the first transmission power level is determined further based on a reception power of the reservation signal. The apparatus further includes wherein the first network operating entity has priority among the plurality of network operating entities during the TXOP, and wherein the first transmission power level is determined further based on an operating transmission power level of the first network operating entity.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   identifying, by a first wireless communication device associated with a first network operating entity of a plurality of network operating entities, a transmission opportunity (TXOP) in a spectrum shared by the plurality of network operating entities, the TXOP comprising a plurality of clear channel assessment (CCA) periods including a CCA period for a higher priority network operating entity and a CCA period for a lower priority network operating entity;
   determining, by the first wireless communication device, a minimum transmission power level between an operating transmission power level of the first network operating entity and an operating transmission power level of a second network operating entity of the plurality of network operating entities, wherein the determining the minimum transmission power level is based on the second network operating entity having a higher priority in the TXOP than the first network operating entity of the plurality of network operating entities;
   determining, by the first wireless communication device, a first transmission power level for communicating data during the TXOP based on the determined minimum transmission power level; and
   communicating, by the first wireless communication device with a second wireless communication device associated with the first network operating entity based on the first transmission power level, the data during the TXOP.

2. The method of claim 1, further comprising receiving, by the first wireless communication device, transmission power information associated with at least one of the plurality of network operating entities.

3. The method of claim 2, further comprising transmitting, by the first wireless communication device to the second wireless communication device, the transmission power information associated with at least one of the plurality of network operating entities.

4. The method of claim 2, wherein the transmission power information indicates the operating transmission power level of the second network operating entity.

5. The method of claim 4, further comprising:
   determining, by the first wireless communication device, a reservation signal detection threshold based on the operating transmission power level of the second network operating entity; and
   monitoring, by the first wireless communication device in a first CCA period of the plurality of CCA periods within the TXOP, for a reservation signal for the TXOP from the second network operating entity based on the reservation signal detection threshold.

6. The method of claim 1, further comprising:
- determining, by the first wireless communication device, a reservation signal detection threshold based on an operating transmission power level of the first network operating entity; and
- monitoring, by the first wireless communication device in a first CCA period of the plurality of CCA periods within the TXOP, for a reservation signal for the TXOP from the second network operating entity based on the reservation signal detection threshold.

7. The method of claim 6, wherein the reservation signal detection threshold is determined further based on an inverse of the operating transmission power level of the first network operating entity.

8. The method of claim 1, further comprising monitoring, by the first wireless communication device in a first CCA period of the plurality of CCA periods within the TXOP, for a reservation signal from the second network operating entity, wherein the first transmission power level is determined further based on a reception power of the reservation signal.

9. The method of claim 1, further comprising:
- communicating, by the first wireless communication device with a third wireless communication device during another TXOP, another communication signal using the operating transmission power level of the first network operating entity based on the first network operating entity having a higher priority than the second network operating entity in the another TXOP.

10. An apparatus comprising:
- a processor configured to:
  - identify, a transmission opportunity (TXOP) in a spectrum shared by a plurality of network operating entities, the TXOP comprising a plurality of clear channel assessment (CCA) periods including a CCA period for a higher priority network operating entity and a CCA period for a lower priority network operating entity, wherein the apparatus is associated with a first network operating entity of the plurality of network operating entities;
  - determine a minimum transmission power level between an operating transmission power level of the first network operating entity and an operating transmission power level of a second network operating entity of the plurality of network operating entities, the minimum transmission power level being determined based on the second network operating entity having a higher priority in the TXOP than the first network operating entity of the plurality of network operating entities; and
  - determine a first transmission power level for communicating data during the TXOP based on the determined minimum transmission power level; and
- a transceiver configured to communicate, with a second wireless communication device associated with the first network operating entity based on the first transmission power level, the data during the TXOP.

11. The apparatus of claim 10, wherein the transceiver is further configured to receive transmission power information associated with at least one of the plurality of network operating entities.

12. The apparatus of claim 11, wherein the transceiver is further configured to transmit, to the second wireless communication device, the transmission power information associated with at least one of the plurality of network operating entities.

13. The apparatus of claim 11, wherein the transmission power information indicates the operating transmission power level of the second network operating entity.

14. The apparatus of claim 13, wherein the processor is further configured to:
- determine a reservation signal detection threshold based on the operating transmission power level of the second network operating entity; and
- monitor, in a first CCA period of the plurality of CCA periods within the TXOP, for a reservation signal for the TXOP from the second network operating entity based on the reservation signal detection threshold.

15. The apparatus of claim 10, wherein the processor is further configured to:
- determine a reservation signal detection threshold based on an operating transmission power level of the first network operating entity; and
- monitor, in a first CCA period of the plurality of CCA periods within the TXOP, for a reservation signal for the TXOP from the second network operating entity based on the reservation signal detection threshold.

16. The apparatus of claim 15, wherein the reservation signal detection threshold is determined further based on an inverse of the operating transmission power level of the first network operating entity.

17. The apparatus of claim 10, wherein the processor is further configured to monitor, in a first CCA period of the plurality of CCA periods within the TXOP, for a reservation signal from the second network operating entity, and wherein the first transmission power level is determined further based on a reception power of the reservation signal.

18. The apparatus of claim 10, wherein the transceiver is further configured to:
- communicate, with a third wireless communication device during another TXOP, another communication signal using the operating transmission power level of the first network operating entity based on the first network operating entity having a higher priority than the second network operating entity in the another TXOP.

19. A non-transitory computer-readable medium having program code recorded thereon, the program code comprising:
- code for causing a first wireless communication device to identify a transmission opportunity (TXOP) in a spectrum shared by a plurality of network operating entities, wherein the first wireless communication device is associated with a first network operating entity of the plurality of network operating entities, the TXOP comprising a plurality of clear channel assessment (CCA) periods including a CCA period for a higher priority network operating entity and a CCA period for a lower priority network operating entity;
- code for causing the first wireless communication device to determine a minimum transmission power level between an operating transmission power level of the first network operating entity and an operating transmission power level of a second network operating entity of the plurality of network operating entities, the minimum transmission power level being determined based on the second network operating entity having a higher priority in the TXOP than the first network operating entity of the plurality of network operating entities;

code for causing the first wireless communication device to determine a first transmission power level for communicating data during the TXOP based on the determined minimum transmission power level; and code for causing the first wireless communication device to communicate, with a second wireless communication device associated with the first network operating entity based on the first transmission power level, the data during the TXOP.

20. The non-transitory computer-readable medium of claim 19, further comprising code for causing the first wireless communication device to receive transmission power information associated with at least one of the plurality of network operating entities, the transmission power information indicating the operating transmission power level of the second network operating entity.

21. The non-transitory computer-readable medium of claim 20, further comprising code for causing the first wireless communication device to transmit, to the second wireless communication device, the transmission power information associated with at least one of the plurality of network operating entities.

22. The non-transitory computer-readable medium of claim 19, further comprising:

code for causing the first wireless communication device to determine a reservation signal detection threshold based on the operating transmission power level of the second network operating entity; and code for causing the first wireless communication device to monitor, in a first CCA period of the plurality of CCA periods within the TXOP, for a reservation signal for the TXOP from the second network operating entity based on the reservation signal detection threshold.

23. The non-transitory computer-readable medium of claim 19, further comprising:

code for causing the first wireless communication device to determine a reservation signal detection threshold based on an operating transmission power level of the first network operating entity; and code for causing the first wireless communication device to monitor, in a first CCA period of the plurality of CCA periods within the TXOP, for a reservation signal for the TXOP from the second network operating entity based on the reservation signal detection threshold, wherein the reservation signal detection threshold is determined further based on an inverse of the operating transmission power level of the first network operating entity.

24. The non-transitory computer-readable medium of claim 19, further comprising:

code for causing the first wireless communication device to communicate, with a third wireless communication device during another TXOP, another communication signal using the operating transmission power level of the first network operating entity based on the first network operating entity having a higher priority than the second network operating entity in the another TXOP.

25. An apparatus for wireless communication, comprising:

means for identifying, by a first wireless communication device associated with a first network operating entity of a plurality of network operating entities, a transmission opportunity (TXOP) in a spectrum shared by the plurality of network operating entities, the TXOP comprising a plurality of clear channel assessment (CCA) periods including a CCA period for a higher priority network operating entity and a CCA period for a lower priority network operating entity;

means for determining a minimum transmission power level between an operating transmission power level of the first network operating entity and an operating transmission power level of a second network operating entity of the plurality of network operating entities, wherein the determining the minimum transmission power level is based on the second network operating entity having a higher priority in the TXOP than the first network operating entity of the plurality of network operating entities;

means for determining, by the first wireless communication device, a first transmission power level for communicating data during the TXOP based on the determined minimum transmission power level; and means for communicating, by the first wireless communication device with a second wireless communication device associated with the first network operating entity based on the first transmission power level, the data during the TXOP.

26. The apparatus of claim 25, further comprising:

means for receiving, by the first wireless communication device, transmission power information associated with at least one of the plurality of network operating entities; and means for transmitting, by the first wireless communication device to the second wireless communication device, the transmission power information associated with at least one of the plurality of network operating entities, wherein the transmission power information indicates the operating transmission power level of the second network operating entity.

27. The apparatus of claim 25, further comprising:

means for determining, by the first wireless communication device, a reservation signal detection threshold based on an operating transmission power level of the first network operating entity; and means for monitoring, by the first wireless communication device in a first CCA period of the plurality of CCA periods within the TXOP, for a reservation signal for the TXOP from the second network operating entity based on the reservation signal detection threshold.

28. The apparatus of claim 25, further comprising:

means for communicating, with a third wireless communication device during another TXOP, another communication signal using the operating transmission power level of the first network operating entity based on the first network operating entity having a higher priority than the second network operating entity in the another TXOP.

* * * * *